US010764329B2

(12) United States Patent
Sander et al.

(10) Patent No.: US 10,764,329 B2
(45) Date of Patent: Sep. 1, 2020

(54) ASSOCIATIONS AMONG DATA RECORDS IN A SECURITY INFORMATION SHARING PLATFORM

(71) Applicant: ENTIT Software LLC, Sunnyvale, CA (US)

(72) Inventors: Tomas Sander, Princeton, NJ (US); Nadav Cohen, Sunnyvale, CA (US); Brian Frederik Hosea Che Hein, Aliso Viejo, CA (US); Ted Ross, Austin, TX (US)

(73) Assignee: Micro Focus LLC, Santa Clara, CA (US)

( * ) Notice: Subject to any disclaimer, the term of this patent is extended or adjusted under 35 U.S.C. 154(b) by 179 days.

(21) Appl. No.: 15/760,983

(22) PCT Filed: Sep. 25, 2015

(86) PCT No.: PCT/US2015/052447
§ 371 (c)(1),
(2) Date: Mar. 16, 2018

(87) PCT Pub. No.: WO2017/052643
PCT Pub. Date: Mar. 30, 2017

(65) Prior Publication Data
US 2018/0255104 A1    Sep. 6, 2018

(51) Int. Cl.
*H04L 29/06*       (2006.01)
*H04L 29/08*       (2006.01)
(Continued)

(52) U.S. Cl.
CPC ............ *H04L 63/20* (2013.01); *G06F 16/951* (2019.01); *G06F 21/577* (2013.01);
(Continued)

(58) Field of Classification Search
CPC ... H04L 63/20; H04L 63/145; H04L 67/1097; H04L 29/06; H04L 29/08; H04L 63/951;
(Continued)

(56) References Cited

U.S. PATENT DOCUMENTS 8,631,489 B2 *    1/2014    Antonakakis ....... H04L 61/1511
                                                          709/223
8,667,583 B2    3/2014    Polyakov et al.
(Continued)

FOREIGN PATENT DOCUMENTS

EP            2738708 A1       6/2014
WO        WO2013147889       10/2013

OTHER PUBLICATIONS

Chismon, D., et al., "Threat Intelligence: Collecting, Analysing, Evaluating," Mar. 20, 2015, MWR InfoSecurity, 36 pages.
(Continued)

*Primary Examiner* — Jayesh M Jhaveri
(74) *Attorney, Agent, or Firm* — Trop, Pruner & Hu, P.C.

(57) ABSTRACT

Examples disclosed herein relate to associations among data records in a security information sharing platform. Some examples may enable creating, in the security information sharing platform that enables sharing of security information among a plurality of users, an association between a first security indicator comprising a first observable and a first data record based on sightings of the first observable by at least one source entity associated with the first data record. Some examples may further enable obtaining a search query that specifies the first security indicator, and identifying a set of data records that satisfy the search query. The set of data records may include the first data record.

20 Claims, 5 Drawing Sheets

(51) Int. Cl.
  *G06F 21/57* (2013.01)
  *G06F 21/62* (2013.01)
  *G06F 16/951* (2019.01)
(52) U.S. Cl.
  CPC ........ *G06F 21/6227* (2013.01); *H04L 63/145*
       (2013.01); *H04L 67/1097* (2013.01)
(58) Field of Classification Search
  CPC .. G06F 16/951; G06F 21/577; G06F 21/6227;
       G06F 21/57; G06F 21/62
  See application file for complete search history.

(56) References Cited

U.S. PATENT DOCUMENTS

| | | | |
|---|---|---|---|
| 8,813,228 B2 | 8/2014 | Magee et al. | |
| 8,850,588 B2 | 9/2014 | Jumar et al. | |
| 9,009,321 B2 | 4/2015 | Alperovitch et al. | |
| 9,009,827 B1 | 4/2015 | Albertson et al. | |
| 9,015,846 B2* | 4/2015 | Watters | G06F 21/577 |
| | | | 726/22 |
| 9,547,689 B2* | 1/2017 | Chandrasekaran | G06F 16/245 |
| 2002/0038430 A1 | 3/2002 | Edwards et al. | |
| 2003/0005193 A1 | 1/2003 | Seroussi et al. | |
| 2003/0126470 A1 | 7/2003 | Crites et al. | |
| 2006/0294388 A1 | 12/2006 | Abraham et al. | |
| 2010/0100956 A1 | 4/2010 | Fusari | |
| 2011/0225650 A1 | 9/2011 | Margolies et al. | |
| 2012/0110633 A1 | 5/2012 | An et al. | |
| 2012/0130863 A1 | 5/2012 | Tedjamulia et al. | |
| 2012/0151569 A1 | 6/2012 | Farsedakis | |
| 2012/0233098 A1* | 9/2012 | Schwoegler | G06N 7/005 |
| | | | 706/12 |
| 2012/0246730 A1* | 9/2012 | Raad | H04L 61/1511 |
| | | | 726/25 |
| 2013/0086484 A1 | 4/2013 | Antin et al. | |
| 2013/0179679 A1 | 7/2013 | Broustis et al. | |
| 2013/0204664 A1 | 8/2013 | Romagnolo et al. | |
| 2014/0007190 A1* | 1/2014 | Alperovitch | G06Q 50/01 |
| | | | 726/3 |
| 2014/0201836 A1 | 7/2014 | Amsler | |
| 2014/0304182 A1 | 10/2014 | Kurien et al. | |
| 2015/0046990 A1 | 2/2015 | Oberheide et al. | |
| 2015/0172311 A1 | 6/2015 | Freedman et al. | |
| 2016/0162690 A1* | 6/2016 | Reith | G06F 21/577 |
| | | | 726/25 |
| 2018/0005331 A1* | 1/2018 | Wang | A63F 13/25 |

OTHER PUBLICATIONS

International Search Report and Written Opinion dated Jul. 1, 2016, PCT Patent Application No. PCT/US2015/054961 dated Oct. 9, 2015, 10 pages total.

International Search Report and Written Opinion dated Jul. 8, 2016, PCT Patent Application No. PCT/US2015/054989 dated Oct. 9, 2015, 10 pages total.

Scekic, O,. et al., "Incentives and Rewarding in Social Computing," Jun. 2013, Communications of the ACM, vol. 56, No. 6, 11 pages.

Barnum, S;, Standardizing Cyber Threat Intelligence Information with the Structured Threat Information eXpression (STIX™), May 30, 2013, The NITRE Corporation Retrieved from the internet: <https://stix.mitre.org/about/documents/STIX_Whitepaper_v1.0.pdf>.

International Search Report and Written Opinion dated Jul. 8, 2016, PCT Patent Application No. PCT/US2015/052447 dated Sep. 25, 2015, Korean Intellectual Property Office.

Microsoft Corporation, Microsoft Advanced Threat Analytics, May 4, 2015, Retrieved from the Internet: <http://www.microsoft.com/en-US/server-cloud/products/advanced-threat-analytics/>.

* cited by examiner

ASSOCIATIONS AMONG DATA RECORDS IN A SECURITY INFORMATION SHARING PLATFORM

BACKGROUND

Users of a security information sharing platform share security information (e.g., security indicators, observables, threat actors, malware samples, chains of attack, attack campaigns, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

Figure 1:
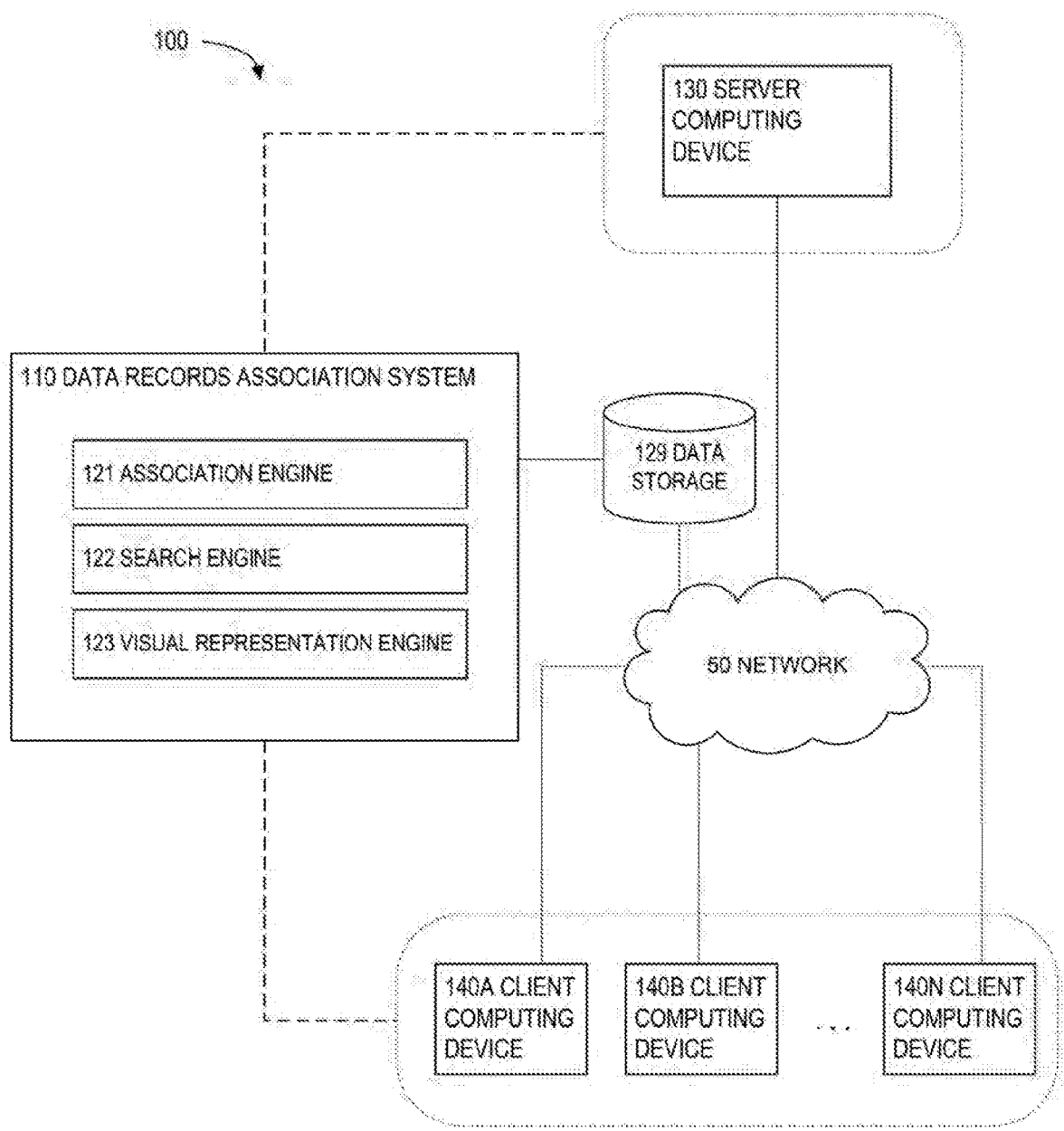
FIG. 1 is a block diagram depicting an example environment in which various examples may be implemented as a data records association system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform share security information (e.g., security indicators, observables, threat actors, malware samples, chains of attack, attack campaigns, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address, a domain name, an e-mail address, Uniform Resource Locator (URL), and a software file hash. A security indicator may comprise a single observable (e.g., "a new file is created by an executable") or a plurality of observables (e.g., "a new file is created by an executable and "the executable connects to domain X").

A security indicator may be created by and/or originated from at least one of a plurality of source entities. For example, the plurality of source entities may include a user (e.g., analysts and/or community members of the security information sharing platform). A security indicator may be manually created and/or added to the security information sharing platform by the user. In another example, the plurality of source entities may include a threat intelligence provider that provides threat intelligence feeds. A security indicator that is found in the intelligence feeds, for example, may be created and/or added to the security information sharing platform. There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria. Other examples of source entities may include but not be limited to government sources and open source feeds.

As more security indicators are gathered from various source entities and added to the security information sharing platform, the security information sharing platform would become a rich source of threat intelligence information itself. To maximize the richness of threat intelligence information gathered by the platform, it may be important to define appropriate associations and/or relationships among various data records resided in the security information sharing platform, which can be a time-consuming and technically challenging task.

Examples disclosed herein provide solutions to these challenges by providing a technique to create associations among data records in the security information sharing platform. This would allow, for example, an analyst to mine and interactively traverse the intelligence data of the platform, leveraging the associations and/or relationships defined among the data records. As a result, the security information sharing platform may provide important tactical and strategic information to the analyst (e.g., about which threat actors may be attacking his/her organizations and which security indicators the analyst should look for in his/her infrastructure).

Some examples may enable creating, in the security information sharing platform, an association between a first security indicator comprising a first observable and a first data record based on sightings of the first observable by at least one source entity associated with the first data record. Some examples may further enable obtaining a search query that specifies the first security indicator, and identifying a set of data records that satisfy the search query. The set of data records may include the first data record.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a data records association system 110. Data records association system 110 may include a server computing device in communication with client computing devices via a network 50. The client computing devices may communicate requests to and/or receive responses from the server computing device. The server computing device may receive and/or respond to requests from the client computing devices. The client computing devices may be any type of computing device providing a user interface through which a user can interact with a software application. For example, the client computing devices may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While the server computing device can be a single computing device, the server computing device may include any number of integrated or distributed computing devices.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, data records association system 110 and the various components described herein may be implemented in hardware and/or a combination of hardware and programming that configures hardware. Furthermore, in FIG. 1 and other Figures described herein, different numbers of components or entities than depicted may be used.

Data records association system 110 may comprise an association engine 121, a search engine 122, a visual representation engine 123, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Association engine 121 may create, in a security information sharing platform, associations and/or relationships among various data records in a security information sharing platform. As discussed above, the security information sharing platform may enable sharing of security information (e.g., security indicators, observables, threat actors, malware samples, chains of attack, attack campaigns, etc.) among a plurality of users and/or a plurality of communities. For example, a particular security indicator may be associated another data record such as an observable, another security indicator, a threat actor, a malware (e.g., or sample thereof), a chain of attack, an organization, an industry sector, a community, a domain name, an indicator score for the particular security indicator, a source entity, a level of confidence (e.g., the level of confidence that the indicator is actually malicious), a level of severity or potential blocking impact (e.g., the level of severity or potential blocking impact that the indicator may pose), and/or a sighting of an observable of the particular security indicator. Note that any associations created by association engine 121 may be modified and/or removed at any given time.

Such associations among different data records resided in the security information sharing platform may be created in various ways:

In some implementations, association engine 121 may create an association between the particular security indicator (and/or an observable therein) and a data record based on user input. For example, as a user submits the particular security indicator to the platform, the user (or another user) may choose to share other information that the user has regarding the indicator. The user who has the knowledge about a threat actor behind the security threat posed by the particular security indicator may create the association between the particular security indicator and the data record that corresponds to that threat actor using the platform.

In some implementations, association engine 121 may create an association between the particular security indicator (and/or an observable therein) and a data record based on whether the data record is created in the same case as the particular security indicator (and/or an observable therein). For example, a user may open a new case in the security information sharing platform and submit 3 security indicators that are related to this new case. This may cause association engine 121 to create the associations between these 3 indicators and/or observables therein.

In some implementations, association engine 121 may create an association between the particular security indicator (and/or an observable therein) and a data record based on external data (e.g., data external to the security information sharing platform). In one example, domain name service (DNS) data (e.g., passive DNS data) may include an IP address (e.g., an observable) associated with a particular domain name (e.g., internic.net), a particular registrar (e.g., ABC Registrar, Inc.), a particular nameserver (e.g., NS.EXAMPLE.COM), etc. Association engine 121 may identify a data record corresponding to the particular domain name in the security information sharing platform and may create an association between the particular security indicator having that IP address and the data record corresponding to the particular domain name. In another example, threat intelligence feeds may be used to identify data records that may be associated with the particular security indicator. In many cases, the threat intelligence feeds may include the information related to a threat actor, a severity, an organization, an industry sector, etc. with respect to individual security indicators in the feeds. Association engine 121 may refer to the threat intelligence feeds to create appropriate associations between the particular security indicator and a data record corresponding to the threat actor, severity, organization, industry sector, etc. as identified in the threat intelligence feeds.

In some implementations, association engine 121 may create an association between the particular security indicator (and/or an observable therein) and a data record (e.g., malware sample) based on an automated malware analysis. The automated malware analysis may, for example, build a mapping of IP address, domains, registry changes, and/or other security indicators to a specific malware sample (e.g., each sample may be identified a corresponding malware identifier). Based on this analysis, association engine 121 may create appropriate associations between indicators (and/or the observables therein) and the malware samples. In some situations, different malware samples may be clustered (e.g., associated by association engine 121) to create a malware cluster if the analysis determines that those malware samples are sufficiently similar (e.g., a common author, similar codes, similar observables, etc.).

In some implementations, association engine 121 may create an association between the particular security indicator (and/or an observable therein) and a data record based on information related to a chain of an attack (or also known as a cyber kill chain). A chain of an attack describes multiple stages of a security attack. For example, an attacker (or threat actor) may send a malware to a victim by email or other means in a first stage. The malware may be installed on a computer by the victim in a second stage. In a third stage, the attacker may perform the steps to achieve his goals inside the victim's network. Using this example, if the particular security indicator is associated with a particular threat actor, the above described kill chain involving the same threat actor may be also associated with the particular security indicator. For example, a data record corresponding to the malware sample identified in the kill chain may be associated with the particular security indicator by association engine 121.

In some implementations, association engine 121 may create an association between the particular security indicator (that comprises an observable) and a data record based on sightings of that observable. For example, the sightings may represent a number (e.g., count) of sightings of the observable by at least one source entity associated with the data record. In other words, it may indicate the number of times that the observable has been observed by at least one source entity. The security information sharing platform may keep track of information related to sightings of an observable. The platform may obtain from a source entity, a sighting of an observable. The sighting of the observable may indicate that the observable has been observed by the source entity. For example, the source entity may detect a certain IP address (e.g., the observable) in its network traffic, and add the observable to the security information sharing platform. This addition of the observable may be considered as a single sighting of the observable. In some instances, when two individuals working for the same organization add the same observable to the platform, the platform may treat these additions as a single sighting of the observable or as two separate sightings of the observable. In another example, when the IP address (e.g., the observable) is found in the threat intelligence feeds provided by a particular threat intelligence provider, this observable may be added to the security information sharing platform as a single sighting of this observable. When two different sets of threat intelligence feeds provided by two different providers include the same observable, the observable may be added as two sightings of the observable.

For example, the data record may represent a group that a source entity belongs to such as an organization (e.g., a bank), an industry sector (e.g., financial services), a geography, and/or a community (e.g., of the security information sharing platform). Consider the following scenario: the particular security indicator having the observable was initially submitted by a user of a first group (e.g., a first community). The security information sharing platform learns that that same observable has been sighted (e.g., observed) by at least one user of a second group (e.g., a second community) for a number of times. Association engine 121 may create an association between the particular security indicator and the second group if the number of sightings (e.g., the number of all of sightings that have been reported so far, the number of sightings over a particular time period, a frequency of sightings, etc.) by users of the second group exceeds a predetermined threshold value. For example, if a total number of sightings by users of the second group equals 8 where the predetermined threshold value has been set to be 7, the association between the particular security indicator and the second group may be created.

Search engine 122 may obtain a search query (e.g., the search query may be submitted by a user of the security information sharing platform). In some implementations, the search query may specify a particular security indicator that a user may want to find more information about. In response to the search query, search engine 122 may identify a set of data records that satisfy the search query. The set of data records may be the records that have associations with the particular security indicator (e.g., associations created by association engine 121). Returning to the above example, the search based on the particular security indicator may return the second group and/or any information that may be associated with the second group. For example, the security indicators that have been created and/or submitted by the users of the second group may be returned in response to the search query. Other associated data records such as malware samples, other observables, threat actors, etc. may also be returned as part of the search results.

Visual representation engine 123 may create or otherwise provide a visual representation of the associations created by association engine 121. In some implementations, visual representation engine 123 may provide a visual representation of associations between the particular security indicator and the set of data records that satisfy the search query (e.g., that specified the particular security indicator). In some instances, a visual representation may show data records as nodes and associations between the data records as edges. For example, a particular security indicator may be shown in the visual representation as a first node while an associated data record (e.g., a malware sample) may be shown as a second node. The association between the particular security indicator and the associated data record may be depicted as an edge in the visual representation. A user may zoom in and/or out of the visual representation to see a specific part of the representation, and may be given an option to drill down each node to review a summary of that node (e.g., a creation or modified time of the corresponding data record, a source entity that created and/or submitted the corresponding data record, etc.). The edges may be shown visually different from each other based on the strength of the associations (e.g., the strength may be measured by a confidence level in a particular association and/or other scoring techniques). For example, a first edge may be shown shorter than a second edge if the association represented by the first edge is stronger that the association represented by the second edge. In another example, the first edge may be shown thinker than the second edge.

In performing their respective functions, engines 121-124 may access data storage 129 and/or other suitable database(s). Data storage 129 may represent any memory accessible to data records association system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Data records association system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
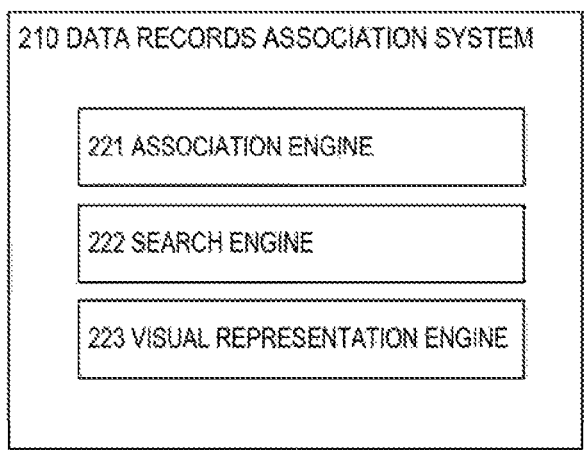
FIG. 2 is a block diagram depicting an example data records association system.

FIG. 2 is a block diagram depicting an example data records association system 210. Data records association system 210 may comprise an association engine 221, a search engine 222, a visual representation engine 223, and/or other engines. Engines 221-223 represent engines 122-123, respectively.

Figure 3:
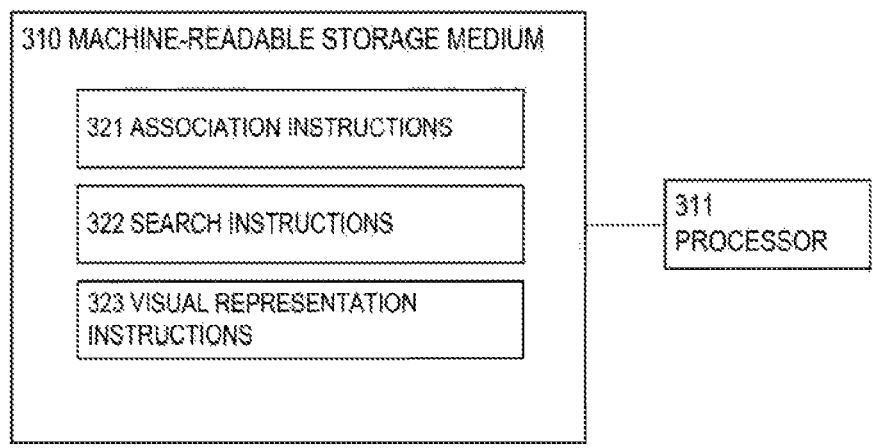
FIG. 3 is a block diagram depicting an example machine-readable storage medium comprising instructions executable by a processor for creating associations among data records in a security information sharing platform.

FIG. 3 is a block diagram depicting an example machine-readable storage medium 310 comprising instructions executable by a processor for creating associations among data records in a security information sharing platform.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements data records association system 110 of FIG. 1.

In FIG. 3, the executable program instructions in machine-readable storage medium 310 are depicted as association instructions 321, search instructions 322, and visual representation instructions 323. Instructions 321-323 represent program instructions that, when executed, cause processor 311 to implement engines 121-123, respectively.

Figure 4:
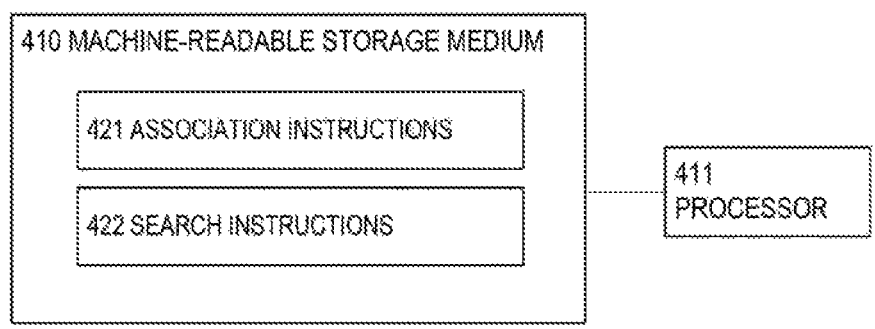
FIG. 4 is a block diagram depicting an example machine-readable storage medium comprising instructions executable by a processor for creating associations among data records in a security information sharing platform.

FIG. 4 is a block diagram depicting an example machine-readable storage medium 410 comprising instructions executable by a processor for creating associations among data records in a security information sharing platform.

Referring to FIG. 4, the programming may be processor executable instructions 421-422 stored on a machine-readable storage medium 410 and the hardware may include a processor 411 for executing those instructions. Thus, machine-readable storage medium 410 can be said to store program instructions or code that when executed by processor 411 implements data records association system 110 of FIG. 1.

In FIG. 4, the executable program instructions in machine-readable storage medium 410 are depicted as association instructions 421 and search instructions 422. Instructions 421-422 represent program instructions that, when executed, cause processor 411 to implement engines 121-122, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement data records association system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-422, and/or other instructions. As an alternative or in addition to retrieving and executing instructions, processor 411 may include at least one electronic circuit comprising a number of electronic components for performing the functionality of at least one of instructions 421-422, and/or other instructions.

Figure 5:
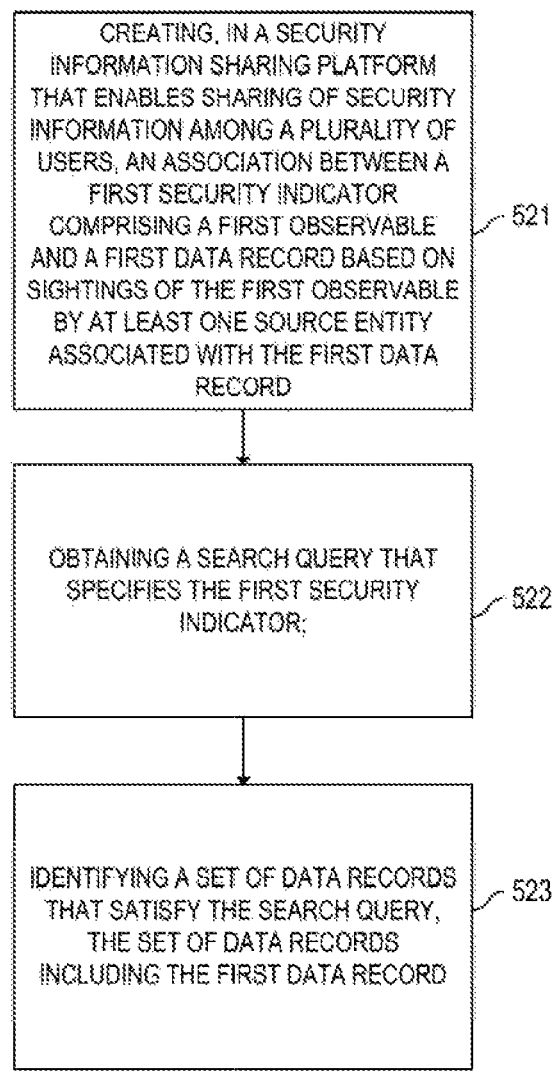
FIG. 5 is a flow diagram depicting an example method for creating associations among data records in a security information sharing platform.

FIG. 5 is a flow diagram depicting an example method 500 for creating associations among data records in a security information sharing platform. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include creating, in a security information sharing platform that enables sharing of security information among a plurality of users, an association between a first security indicator comprising a first observable and a first data record based on sightings of the first observable by at least one source entity associated with the first data record. Referring back to FIG. 1, association engine 121 may be responsible for implementing block 521.

In block 522, method 500 may include obtaining a search query that specifies the first security indicator. Referring back to FIG. 1, search engine 122 may be responsible for implementing block 522.

In block 523, method 500 may include identifying a set of data records that satisfy the search query, the set of data records including the first data record. Referring back to FIG. 1, search engine 122 may be responsible for implementing block 523.

Figure 6:
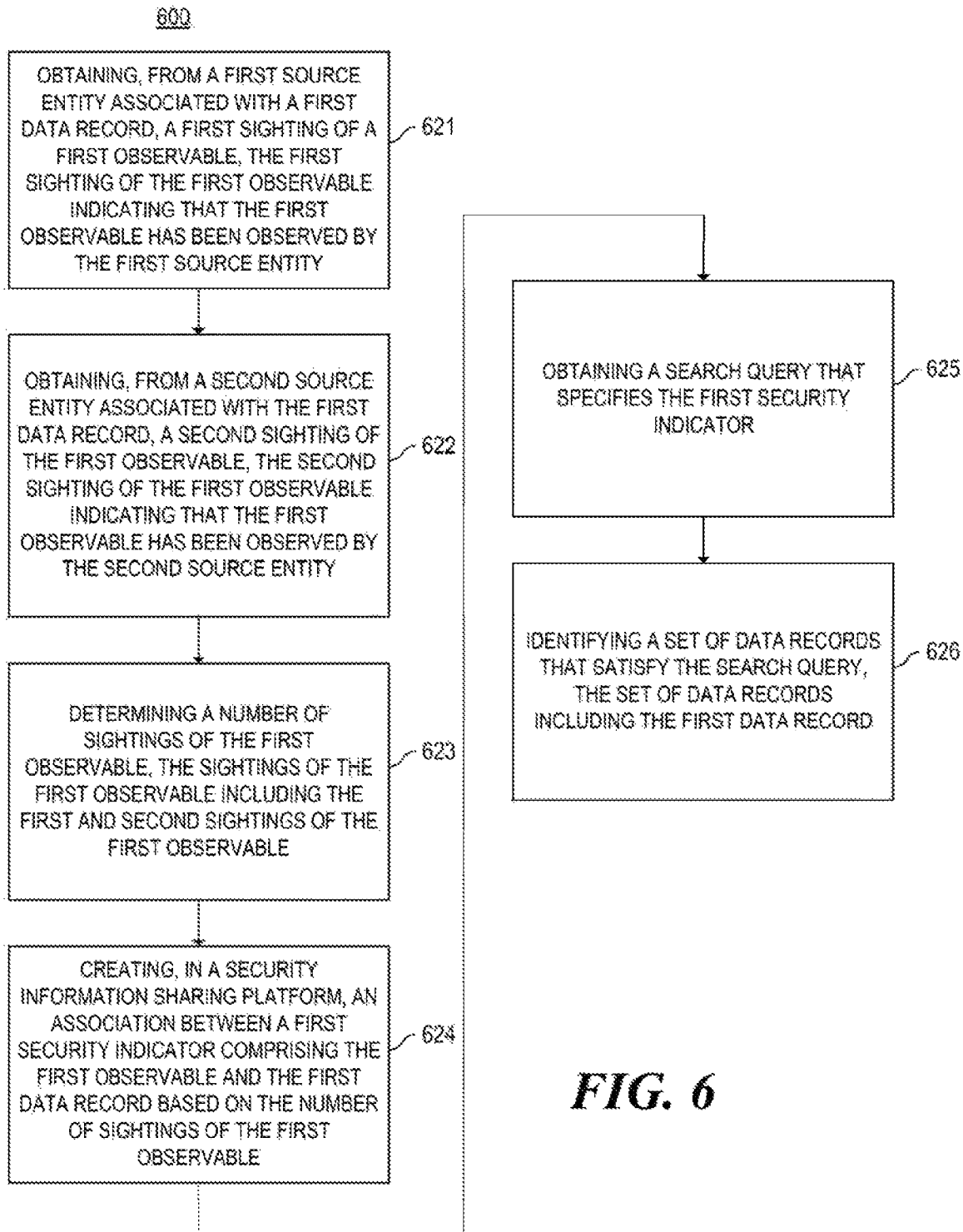
FIG. 6 is a flow diagram depicting an example method for creating associations among data records in a security information sharing platform.

FIG. 6 is a flow diagram depicting an example method 600 for creating associations among data records in a security information sharing platform. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

In block 621, method 600 may include obtaining, from a first source entity associated with a first data record, a first sighting of A first observable, the first sighting of the first observable indicating that the first observable has been observed by the first source entity. Referring back to FIG. 1, association engine 121 may be responsible for implementing block 621.

In block 622, method 600 may include obtaining, from a second source entity associated with the first data record, a second sighting of the first observable, the second sighting of the first observable indicating that the first observable has been observed by the second source entity. Referring back to FIG. 1, association engine 121 may be responsible for implementing block 622.

In block 623, method 600 may include determining a number of sightings of the first observable, the sightings of the first observable including the first and second sightings of the first observable. Referring back to FIG. 1, association engine 121 may be responsible for implementing block 623.

In block 624, method 600 may include creating, in a security information sharing platform, an association between a first security indicator comprising the first observable and the first data record based on the number of sightings of the first observable. Referring back to FIG. 1, association engine 121 may be responsible for implementing block 624.

In block 625, method 600 may include obtaining a search query that specifies the first security indicator. Referring back to FIG. 1, search engine 122 may be responsible for implementing block 625.

In block 626, method 600 may include identifying a set of data records that satisfy the search query, the set of data records including the first data record. Referring back to FIG. 1, search engine 122 may be responsible for implementing block 626.

The foregoing disclosure describes a number of example implementations for associations among data records in a security information sharing platform. The disclosed examples may include systems, devices, computer-readable storage media, and methods for creating associations among data records in a security information sharing platform. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for creating associations among data records in a security information sharing platform, the method comprising:

determining, by a processor in a security information sharing platform that enables sharing of security information among a plurality of users, a number of sightings of a first observable by members of a particular group of users, wherein the first observable is included in a first security indicator;

determining, by the processor, whether the number of sightings of the first observable exceeds a predetermined threshold;

prior to receiving a search query, the processor generating a first association between the first security indicator and a first data record in response to a determination that the number of sightings of the first observable exceeds the predetermined threshold, wherein the first data record represents the particular group of users;

after generating the first association, the processor receiving the search query, wherein the search query specifies the first security indicator; and identifying, by the processor, a set of data records that satisfy the search query using the first association, the set of data records including the first data record.

2. The method of claim 1, wherein the first observable is a particular Internet Protocol (IP) address.

3. The method of claim 1, further comprising:
identifying a threat actor for the first security indicator from a threat intelligence feed; and
creating, by the processor in the security information sharing platform, a second association between the first security indicator and a second data record that represents the threat actor.

4. The method of claim 1, further comprising:
creating, by the processor in the security information sharing platform, a second association between the first security indicator and a second data record based on Domain Name Service (DNS) data, wherein the second data record represents a domain name.

5. The method of claim 4, further comprising:
providing the set of data records in response to the search query, wherein the set of data records also includes the second data record.

6. The method of claim 1, wherein the first observable is a particular email address.

7. The method of claim 1, wherein the first observable is a particular software file hash.

8. A non-transitory machine-readable storage medium comprising instructions executable by a processor of a computing device for creating associations among data records in a security information sharing platform, the machine-readable storage medium comprising:
instructions to determine a number of sightings of a first observable by members of a particular group of users, wherein the first observable is included in a first security indicator;
instructions to determine whether the number of sightings of the first observable exceeds a predetermined threshold;
instructions to create, prior to receiving a search query, a first association between the first security indicator comprising the first observable and a first data record in response to a determination that the number of sightings of the first observable exceeds the predetermined threshold, wherein the first data record represents the particular group of users;
instructions to, after creating the first association, receive the search query, wherein the search query specifies the first security indicator; and
instructions to, in response to the search query, provide the first data record using the first association.

9. The non-transitory machine-readable storage medium of claim 8, wherein the first observable is a particular Internet Protocol (IP) address.

10. The non-transitory machine-readable storage medium of claim 8, further comprising:
instructions to create a visual representation of the first security indicator as a first node, the first data record as a second node, and the first association between the first security indicator and the first data record as an edge between the first and second nodes.

11. The non-transitory machine-readable storage medium of claim 8, wherein the first observable is a particular email address.

12. A system for creating associations among data records in a security information sharing platform comprising:
a processor to:
determine, in a security information sharing platform that enables sharing of security information among a plurality of users, a number of sightings of a first observable by members of a particular group of users, wherein the first observable is included in a security indicator;
prior to receiving a search query, in response to a determination that the number of sightings of the first observable exceeds a predetermined threshold, generate a first association between the security indicator comprising the first observable and a first data record, wherein the first data record represents the particular group of users;
after generating the first association, receive the search query, wherein the search query specifies the security indicator;
identify a set of data records that satisfy the search query, the set of data records including the first data record; and
provide a visual representation of associations between the security indicator and the set of data records.

13. The system of claim 12, wherein the first observable is a particular Internet Protocol (IP) address.

14. The system of claim 12, wherein the first observable is a particular email address.

15. The system of claim 12, wherein the first observable is a particular software file hash.

16. The system of claim 12, the processor to:
identify a threat actor for the security indicator from a threat intelligence feed; and
generate a second association between the security indicator and a second data record that represents the threat actor.

17. The system of claim 12, the processor to:
generate a second association between the security indicator and a second data record based on Domain Name Service (DNS) data, wherein the second data record represents a domain name.

18. The non-transitory machine-readable storage medium of claim 8, wherein the first observable is a particular software file hash.

19. The non-transitory machine-readable storage medium of claim 8, further comprising:
instructions to identify a threat actor for the first security indicator from a threat intelligence feed; and
instructions to generate a second association between the first security indicator and a second data record that represents the threat actor.

20. The non-transitory machine-readable storage medium of claim 8, further comprising:
instructions to generate a second association between the first security indicator and a second data record based on Domain Name Service (DNS) data, wherein the second data record represents a domain name.

* * * * *